Dec. 4, 1945.   E. USSANI D'ACCADIA   2,390,058
GAS PRODUCER BY SOLID FUEL, AND SUITABLE TO FEED
GAS MOTORS, AND ESPECIALLY AUTO MOTORS
Filed Dec. 11, 1941
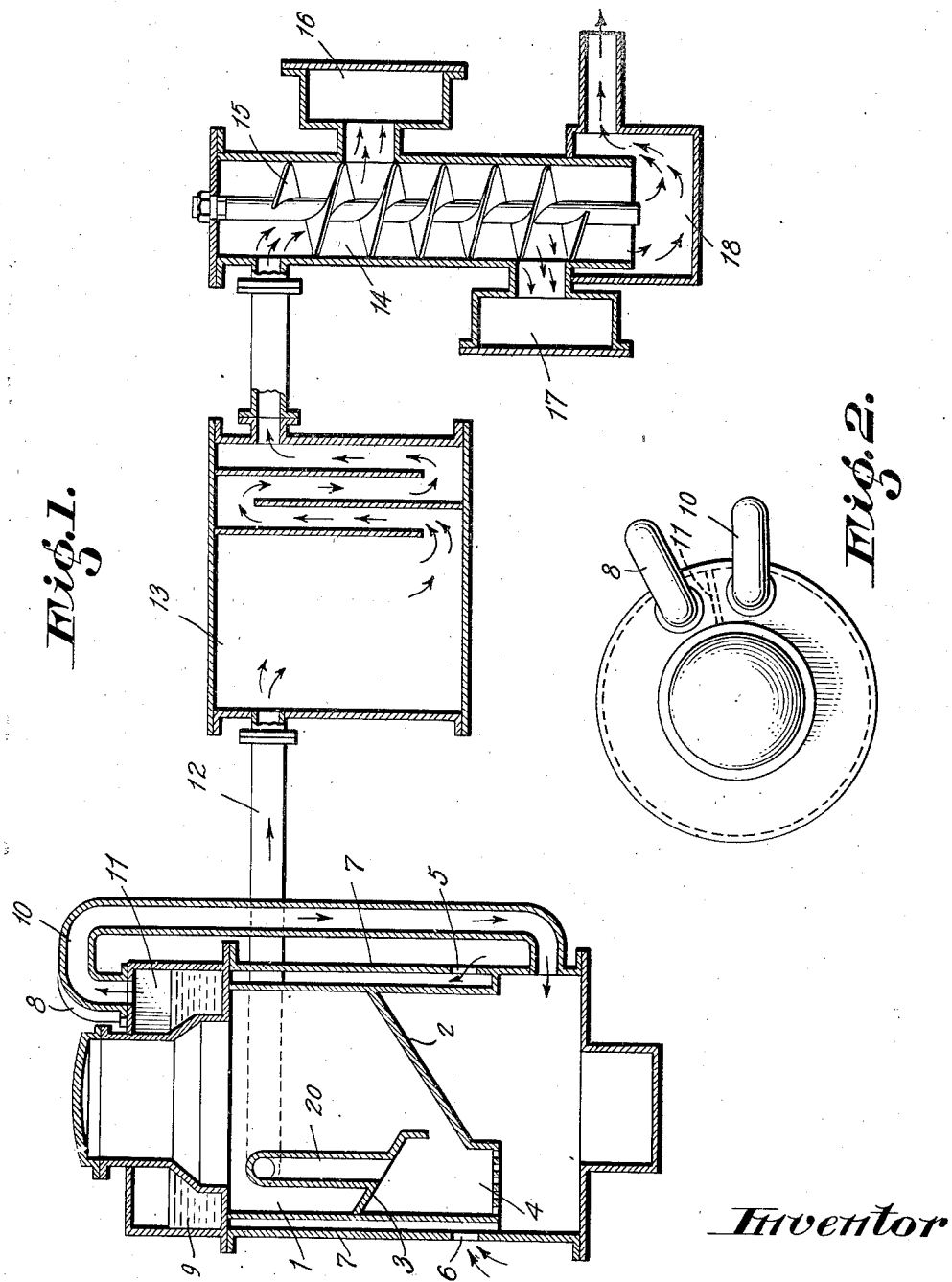
Inventor
Eduardo Ussani D'Accadia
By
Attor Patented Dec. 4, 1945

2,390,058

UNITED STATES PATENT OFFICE 2,390,058

GAS PRODUCER BY SOLID FUEL, AND SUITABLE TO FEED GAS MOTORS, AND ESPECIALLY AUTO MOTORS

Eduardo Ussani D'Accadia, Milan, Italy; vested in the Alien Property Custodian

Application December 11, 1941, Serial No. 422,552
In Italy October 16, 1940

1 Claim. (Cl. 48—118.5)

One of the troubles arising in the gas producers actually in use on motors consists in the loss of compression due to the friction caused by the pressure of the coal placed in the combustion zone. This loss results in a diminished efficiency of the motor for the quantity of gas fed to it.

In order to avoid this loss, there has been provided in the gas producer, means to partly separate the effective burning chamber from the zone forming the fuel storage chamber contained in the gas producer. This offers the additional advantage that a too large fuel mass does not begin to burn or that the combustion zone is not displaced upwards.

Moreover it is the object of the present invention to provide an efficient gas producer apparatus to purify the produced gas.

The drawing represents the combination of a gas producer with apparatus for purifying the gas according to the present invention in which Figure 1 is a view of the assemblage where various elements are shown in section;

Figure 2 is a view from above, of the gas producer.

The gas producer includes a chamber 1, where the fuel is charged from above and is provided with two inclined transversal partitions, 2 and 3, the one opposite the other, thus forming a kind of hopper and a combustion chamber 4, of reduced volume, in which the fuel remains at a permanent level. The air entering at the openings 5 and 6 through the intervening space 7, cools the walls of the space 1 and is heated. This air is then introduced through the pipe 8 into the space 9 containing some water which is licked by it, thus removing some water vapor. The upper end of pipe 8 is shown on Fig. 2 as beginning at the space 9 and then it passes outside the producer downward to connect with the space 7 (not shown).

The air is compelled to run wholly through the annular chamber 9, as the issuing air pipe 10 is arranged adjacent to the pipe 8, but separated from it by a divisory partition 11, which extends through the whole height of the chamber 9. The pipe 10 which, like the pipe 8, is linked with the chamber 9 by means of a wide cone connection, brings the air under the grate. These cone connections are provided in order to avoid that in case of displacements or inclinations of the gas producer, some water be absorbed or would remain there blocking up the air entrance.

The gas produced in the combustion chamber 4 passes out through the elongated pipe 20 which extends through the walls of the producer connecting with the pipe 12. The portion of this latter pipe back of the producer is shown in broken lines. The pipe 12 enters the labyrinth chamber 13 where a good deal of the impurities are removed and therefrom into the purifying chamber 14, containing the spiral 15, which compels the gas to develop a rotary descending movement, thanks to which, by centrifugal movement the heavier impurities are cast outwards and gathered in special collecting tanks 16 and 17 or in the lower tank 18.

The said tank 18 preferably contains a viscous substance suitable to hold the impurities descending along the walls of the chamber 14.

The gas then issues, in a state of great purity, through the pipe 19 which carries it to the motor.

Of course all sizes and building details can vary according to needs, without therewith, however, exceeding the scope of the present invention.

Moreover, every one of the elements above described and illustrated, can also be applied separately, in a system according to the above type.

I claim:

A portable gas producer comprising within the walls thereof a relatively large storage space for solid fuel having substantially the total cross-sectional area of the producer and a combustion space of relatively small cross sectional area, two superposed downwardly slanting partitions forming the bottom of said storage space and extending from the walls of the producer, said partitions terminating in vertically extending lips defining the inner wall and fuel inlet to said combustion space, one of said partitions forming the roof of said combustion space and carrying conduit means therein for conveying the gas generated to the exterior of the producer.

EDUARDO USSANI D'ACCADIA.